Sept. 15, 1931.  O. GARRISON  1,823,734
GEAR GRINDER AND THE LIKE
Original Filed April 22, 1926   6 Sheets-Sheet 1

Inventor
Orlande Garrison
By
Attorney.

Fig. 3.

Sept. 15, 1931.     O. GARRISON     1,823,734
GEAR GRINDER AND THE LIKE
Original Filed April 22, 1926     6 Sheets-Sheet 3

Patented Sept. 15, 1931

1,823,734

UNITED STATES PATENT OFFICE

ORLANDO GARRISON, OF DAYTON, OHIO; ANNA MARIE GARRISON, ADMINISTRATRIX OF SAID ORLANDO GARRISON, DECEASED, ASSIGNOR TO PRATT & WHITNEY COMPANY, OF HARTFORD, CONNECTICUT, A CORPORATION OF NEW JERSEY

GEAR GRINDER AND THE LIKE

Application filed April 22, 1926, Serial No. 103,801. Renewed August 27, 1930.

This invention relates to improvements in gear grinders having particular reference to machines of the character set forth in Patent #1,469,504, issued to me October 2, 1923.

In this type of gear grinders the teeth of the gears ground on the machine are generated in the process of grinding by a suitable abrasive wheel dressed to conform in cross section to the pressure angle of a rack corresponding to the gear teeth to be ground. Thus the grinder wheel sustains to the gear being ground the same relation as a master rack tooth to a master gear when coacting one with the other. This being the theoretically perfect gear relationship, it follows that a gear grinder constructed on this principle will attain perfection in the accuracy of its grinding in the same degree that mechanical accuracy will be attained in the construction of the vital mechanism.

With the master rack and master gear relationship as the basis upon which the gear grinder is constructed, the grinding wheel and gear teeth during the grinding intervals being in the relation of a master rack tooth with a master gear when the same coact one with another, it follows that the opposite faces of adjoining gear teeth will be generated by passing through a single grinding relationship with the grinding wheel. This makes it possible to completely grind a gear with a single setting-up of the work on the machine, thus preventing in the first instance in the grinding operation a common source of error in gear grinders of the generating type which are so organized that the work must be set-up twice for each complete grinding of a gear—first to grind the faces on one side of the gear teeth, and again to grind the faces on the opposite side of the teeth.

A further gain in accuracy is made in the principle of the machine in the rack-tooth shape of the grinder wheel thus enabling the use of the thicker wheel in cross section with less lateral deflection of the wheel under grinding pressure. Also the wheel engages the gear teeth in rapid, successive operations while the gear is rotating, the wheel traversing the faces of the gear teeth in a plane parallel to the axis of the gear, as well as from the crown to the root of the teeth, and vice versa. Thus the grinding wheel has relatively slight contact with the surface of the teeth in the grinding action with slight lateral pressure and no perceptible deflection on the wheel which makes extreme accuracy in grinding possible.

With these conditions predetermined in the basic principle of the machine, it will be seen that with the highest accuracy obtainable by known mechanical practices applied to the construction of all vital parts of the improved gear grinder, a machine approximating perfection in its mechanical organization and in the accuracy of its work will be produced.

To this end the improved gear grinder as herein set forth includes numerous novel features all of which act in some relationship with the machine as a whole to achieve a result in accuracy and volume of production beyond any practice in gear grinding heretofore known.

An outstanding feature of these improvements consists in a system of hydraulic controls for certain groups of the mechanism which effect ease and smoothness of operation and tend greatly to relieve the grinder of operating friction and stresses and thus to minimize maintenance costs and at the same time prolong the normal working life of the machine.

Embodied in the machine, as here shown, is an improved mechanism for dressing the grinder wheel substantially identical with the wheel dresser set forth in Patent #1,573,153 issued to me February 16, 1926, the mechanism being here shown to illustrate and describe the complete grinder.

Throughout the structural organization of the machine numerous improvements have been made over my earlier gear grinder set forth in Patent #1,469,504 as will appear in the accompanying drawings and in the detailed specification.

As here shown the grinder is supported on a bed or base 1 to which the super base 2 is bolted as indicated at 3 to effect an integral frame structure, these parts being massive to minimize operating vibrations. The ram 4 which supports the grinder wheel 5 is supported on ways 4a of base 2, the ways being of ample length to effect a properly balanced relationship and a stabilized movement of the ram with minimized vibration.

Figure 1:
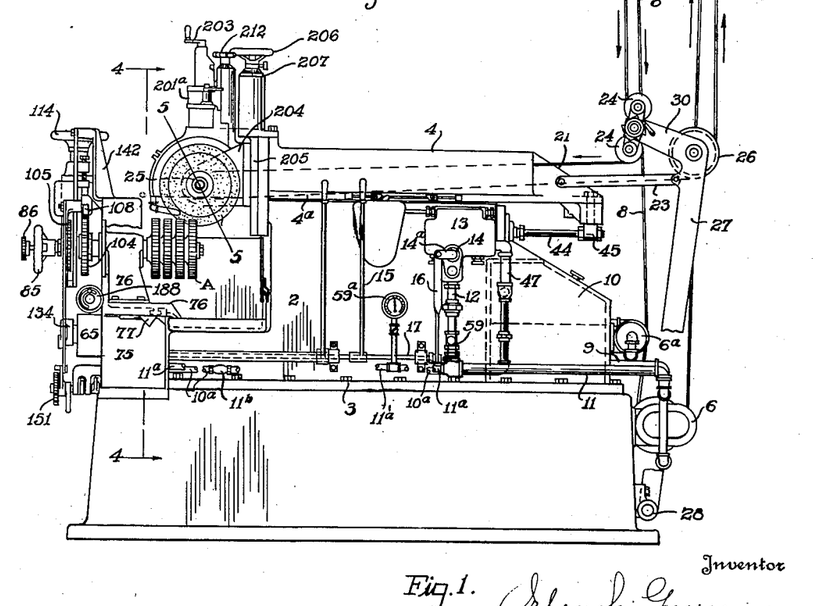
Fig. 1 is an outside view of the gear grinder in side elevation.

The ram is operated by a hydraulic pump 6 and hydraulic motor 13a, pump 6 being driven from counter-shafting 7 by a belt 8. The pump is connected by a pipe 9, as best shown in Fig. 1, to a reservoir or sump 10 in the rear bottom portion of the base 2 which is supplied with a suitable liquid, as oil, for hydraulic operation. From pump 6 the course of the liquid is through pipes 11—12 and valve chest 13 to the motor 13a admission of the liquid to the motor being through a valve 14 connected to a lever 15 by an arm 14a by a link 16 and shaft 17 for manually operating the valve.

Figures 9, 12:
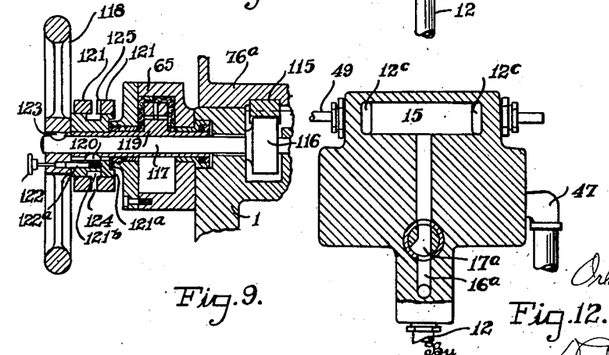
Fig. 9 is a vertical longitudinal sectional view through one of the motors and its associated mechanism.
Fig. 12 is a sectional view taken on lines 12—12 of Fig. 10.

Details of valve 14 are shown in Figs. 10, 11, 12 and 13 to 16. The liquid from pump 6 enters the valve chest through pipe 12, passes upward in channel 12a through the outer ports 14b of the valve through ports 12c into the piston valve cylinder 19, there being one of the ports 12c at each end of cylinder 19 as best shown in Fig. 12. The movement of the liquid from cylinder 19 is through by-pass connections 19a and 40—41 (see Figs. 11–17) to the motor cylinder 42 which is inwardly adjacent the valve chest. A piston 43 operable in cylinder 42 is connected by a piston rod 44 to the ram 4 as indicated at 45. The return or exhaust of the liquid from cylinder 42 is through by-passes 41, 40, cylinder 19 and by-pass 19a, to chamber 18 and through a return pipe 47 back to reservoir 10.

Figure 11:
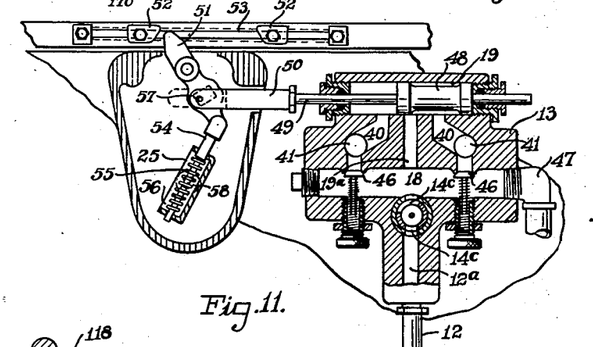
Figure 13:
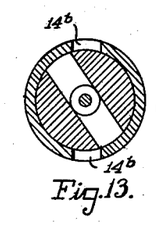
Figs 13–14 and 15–16 are detail sectional views illustrating relative positions of the valves in the mechanism illustrated in Figs. 10, 11 and 12.

Coacting with the by-passes 40—41 are valves 46 which are spring tensioned and adjustable, as best shown in Fig. 11, according to the liquid pressure at which the hydraulic motors operate, the action of the valves being to effect easement or a cushioning action of the piston 43 upon completion of its stroke in both directions, it being understood that the exhaust of the liquid through the respective by-passes is alternate—when cylinder 42 is being charged through one of the by-passes the other by-pass is discharging from the cylinder. When the piston 43 moves in either direction the presssure in the end of the cylinder 42 which is then discharging will rise and would act to retard that action of the piston except that the coacting valve 46 opens in response to the increased pressure permitting a portion of the liquid to escape through the valve into drain chamber 18, thus acting to ease the pressure and to effect uniformity of movement of the piston and also to prevent shock or irregularity of movement of the piston at the end of the stroke.

Figure 10:
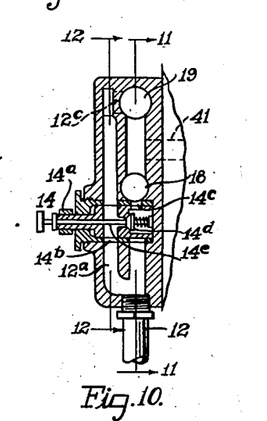
Figs. 10 and 11 are vertical transverse and longitudinal sectional views through the valve chest of the hydraulic motor for operating the ram.
Figures 14, 16:
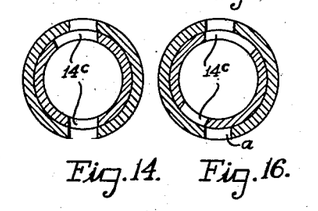
Figure 15:
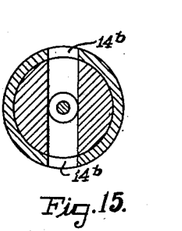
Figures 17, 18, 19, 20, 21:
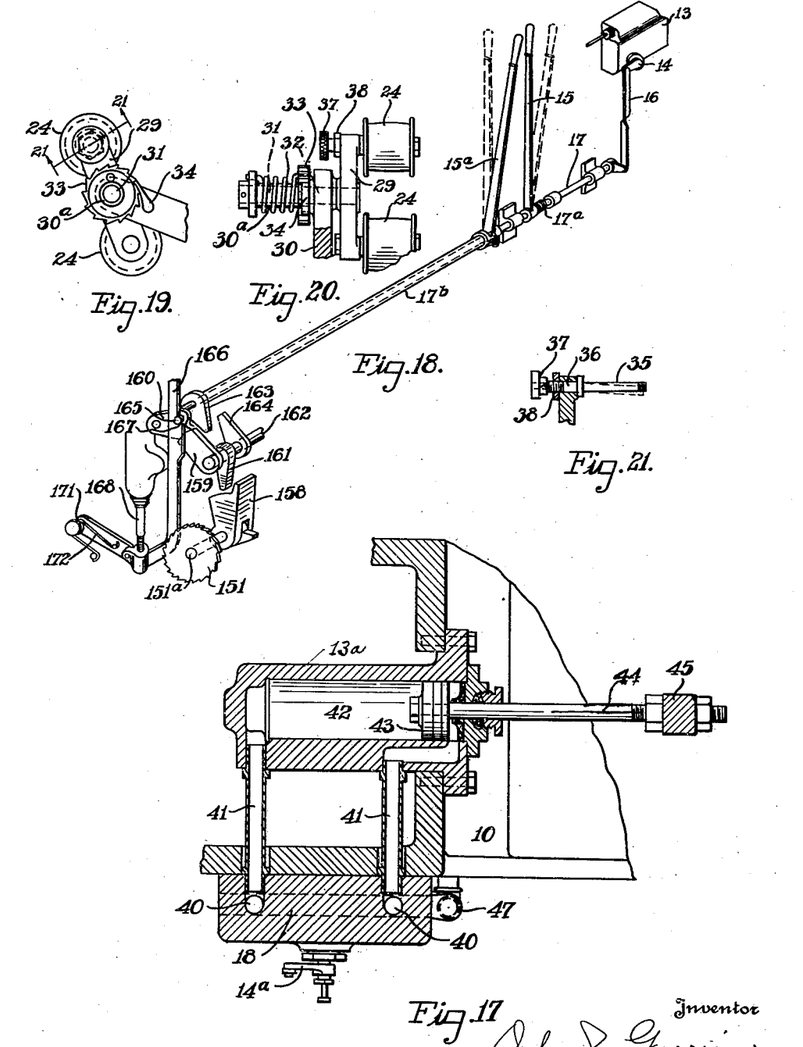
Fig. 17 is a vertical sectional view of the hydraulic motor for operating the ram.
Fig. 18 is an isometric view of the automatic mechanism for controlling the hydraulic motors.
Figs. 19, 20 and 21 are detail views of the guide and adjusting mechanism for the grinder wheel belt.

Valve 14, as best shown in Fig. 10 is a double or duplex valve having in addition to the outer ports 14b inner ports 14c (see Figs. 10–11 and 14–16) which communicate direct with exhaust chamber 18. When the motor is at rest ports 14b will be closed and ports 14c will be full open as shown respectively in Figs. 13–14. The pressure of the liquid in line 12 will then exhaust through ports 14c, chamber 18 and return line 47. When the motor is running, the relation of ports 14b and 14c one to the other will be as indicated in Figs. 15–16, ports 14b being full open and ports 14c semi-closed. Coacting with the ports in this relationship is an auxiliary spring tensioned valve 14d adjustable by means of a stem 14e according to the pressure desired for operating the motor. When the pressure in line 12 becomes greater than that desired for operating the motor, valve 14d will open and permit liquid to escape through the open port 14c into the exhaust chamber and thus act to reduce the pressure to normal.

A pressure regulating valve 59 in line 12

(see Fig. 1), a valve 11b in line 11a and a pressure gage 59a in extension 11a of line 11 serve for regulating and indicating the liquid pressure for operating the hydraulic motors as will presently be described.

Operable in cylinder 19 is a piston valve 48 having a forward extended link 50 connected to the piston rod 49, the link connected to a pivoted spring tensioned trip arm 51 the free end of which lies in the path of opposite stops 52 supported in slots 53 on the lower portion of ram 4, the stops being adjustable in the slot to permit spacing the stops variably one relative to the other to determine the length of stroke of the ram by reversing the direction of movement of the valve piston 48. Coacting with the opposite end of pawl 51 is a spring tensioning device consisting of a pivoted arm 54, a compression spring 55 arranged telescopically on arm 54 in a housing 56, the spring acting as pawl 51 passes the center line between the pivot centers 57—58 of parts 51 and 54 in either direction to impart a quick action to pawl 51 and thus to reverse the movement of valve 48 and determine the length of the stroke of ram 4.

The hydraulic pump and motor equipment for operating the grinder serves to effect ease and smoothness of operation and to minimize machine vibrations and shocks and strains incident to the operating changes. This condition of operating easement throughout the main mechanism of the machine is an important factor in the accuracy of the work produced. The mechanisms which govern the accuracy of the grinding necessarily require very exact adjustments which must be maintained in the operation of the machine. This is made possible in the highest degree by the means for effecting easement of operation of parts associated with the hydraulic motors.

Figure 2:
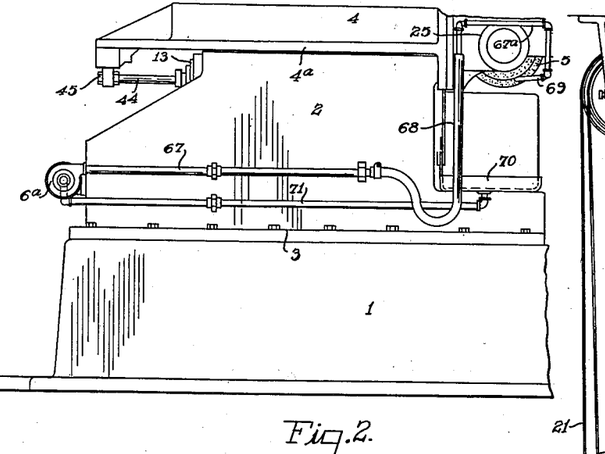
Fig. 2 is a fragmentary view in side eleva-

Operatively associated with the hydraulic ram operating mechanism on the front of the grinder are opposite twin motors 65 (see Figs. 3 and 8) which are connected to the pump 6 by an extension 11a of pipe 11 and with reservoir 10 by a return pipe 10a. Also associated with the hydraulic system is a pump 6a driven by belt 8, a pipe line 67 including a section of flexible hose 68 (see Fig. 2), a pipe extension 67a, nozzle 69, a catch pan 70 and return pipe 71 to the pump. This liquid circulating system serves to constantly discharge a stream of a cooling compound on the edge of the grinder wheel 5 and the work on the machine when the machine is in operation, the pipe extension 67a being secured on the end of the ram which serves to support the nozzle in relatively fixed relation to the grinder wheel.

Rotatable movement is transmitted to the grinder wheel from pulley 22a on countershaft 7 which in turn is driven by a belt 22 from any suitable source of power. From pulley 22a the operating connection to the grinder wheel is a belt 21 operating over belt adjuster pulleys 24 (see detail Figs. 19 to 21), a drive pulley 25 on the shaft of the grinder wheel and return pulley 26, the return pulley and the belt adjuster pulleys being mounted on a rocker arm 27 pivoted on the base of the machine as indicated at 28 and connected to ram 4 by a link 23, being thus adapted to rock back and forth with the reciprocating movement of the ram and to keep belt 21 taut. The belt adjuster pulleys consist of two pulleys 24 supported on an adjustable arm 29 secured to a shaft 31 pivoted in an extension 30 of rocker arm 27, the shaft being tensioned in clock-wise direction by means of a spring 32 coiled on a sleeve 30a of extension arm 30 and adapted to be adjusted in the opposite direction by means of a ratchet and pawl 33—34, thus providing means for adjusting the pulleys 24 angularly to effect adjustments of the belt. The stem 35 upon which the upper pulley 24 is supported is out of axial alignment (see Fig. 21) with the bearing portion 36 of the stem to provide for adjusting the pulley at an angle to belt 23, thus to compensate for variations in the plane of the belt caused by shifting the belt on pulley 22b which is a 4-step cone pulley, to regulate the speed of the grinder wheel. A knurled finger piece 37 for turning the stem and a lock nut 38 for holding the stem are provided for effecting the adjustment.

The mechanism for supporting and adjusting the gears A to be ground (see Figs. 4, 6 and 7) consists of a knee 75 (Fig. 1) extended upward from the bed frame 1 upon which is mounted the work table or carriage 76 to move back and forth on ways 77 transversely of the machine, the work arbor 78—78a (see Figs. 6-7) being supported in work head 76 in a roller sleeve bearing 79—79a having a forwardly extended threaded inserted spindle nose or collet 80 and a collet 81 in its opposite end in which the work arbor is supported, the arbor and parts included in the assembly inside sleeve 79 operating as an integral part in fixed relation one with another.

Figure 6:
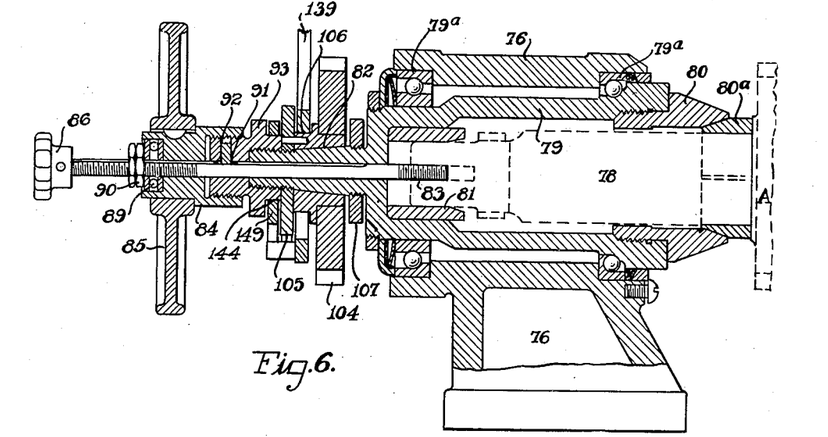
Figs. 6 and 7 are detail sectional views of the master gear and work arbor mechanism.
Figure 7:
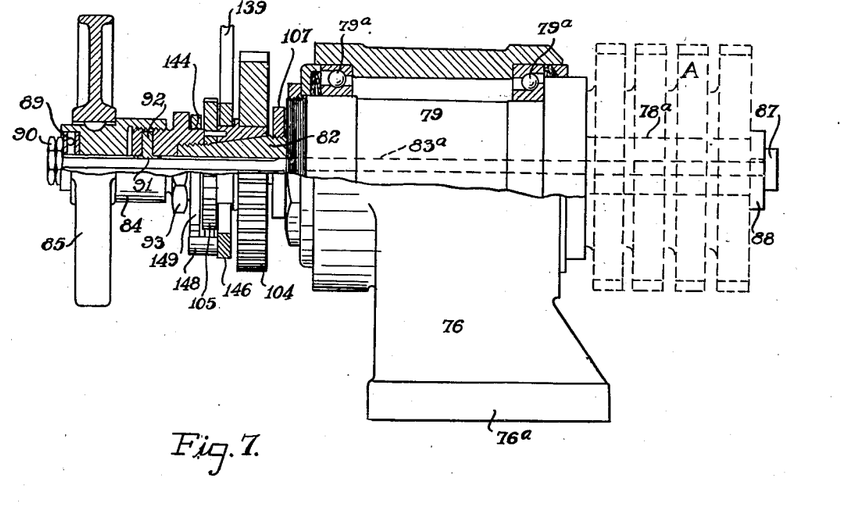

To provide against the possibility of errors of alignment of gears supported on the arbor the work A is held firmly in position on the arbor by adjusting the arbor axially as illustrated in Figs. 6 and 7, a slight modification of construction being shown in the different figures. In Fig. 6 the gear A is integral with the gear shaft 78, in Fig. 7 the gears comprise separate units supported on an arbor 78a. In both constructions sleeve work spindle 79 has a rearwardly extended, tapered sleeve 82 which serves to support a draw bar stem 83—83a threaded into the inner end of the gear shaft 78, as shown in Fig. 6, and extending through the arbor 78a, as shown in Fig. 7, a nut 84 having an adjusting handle 85 being threaded on the draw bar adjacent its opposite end. When gears are set up for grinding on the machine as shown in Fig. 6 the same are first aligned with the master gear, as will presently be described, draw bar 83 is then threaded into shaft 78 and handle 85 is backed-off to draw the gear shaft firmly into the collets 80—81, the gear A being forced against a collet 80a, coacting with the spindle nose 80, with sufficient pressure to locate and firmly hold the gear concentric to sustain the grinding operation.

As shown in Fig. 7 the inner end of draw bar 83a is provided with a head 87, a split washer 88 being interposed between the head and the first unit of gears A. To provide for positive adjustment of the draw bar without friction in nut 84 the same is fitted with a ball bearing 89, the lock nuts 90 serving to adjust the draw bars for length according to the requirement for engaging the work A and also for engaging the bars when nut 84 is backed off for tightening the work in arbor 79, rotation of the draw bar in the latter adjustment being prevented by a key 92 seated in a nut 93, threaded on the work spindle and coacting with nut 84, and in a spline 91 in the draw bar.

Figures 4, 5:
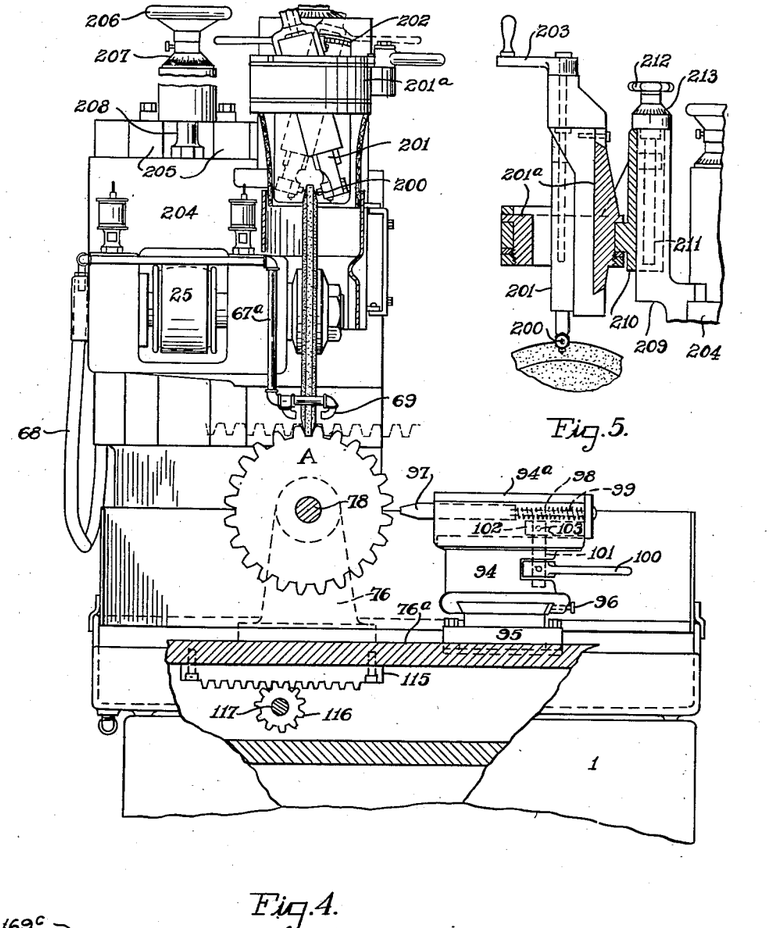
Fig. 4 is a sectional view on line 4—4 of Fig. 1.
Fig. 5 is a side view partly in section of Fig. 4 showing the wheel dressing device.

The mechanism for aligning the gears on the work arbor consists as best shown in a detail of Fig. 4, of a support 94 mounted to be adjusted slidably parallel to the axis of the arbor on a base 95 secured to the work table 76a, set screws 96 serving to hold the mechanism as adjusted. A series of independently projectable fingers 97 are supported in a slidable housing 94a in the upper portion of housing 94, there being a sufficient number of the fingers to permit one or more of the same to engage each of the gears A between adjacent teeth thus to align the gears, the fingers being normally extended by compression springs 98 supported on stems 99 threaded into the fingers. All the fingers are retractable independently one of another by the stems 99 and collectively from their engaged relation with the gears A as illustrated in Fig. 4 by means of a lever 100 connected to a stem 101 having its upper end extended into a recess 102 of housing 94a and provided with an eccentric disc 103 adapted to engage the adjacent walls of the recess and thus to move the housing and fingers 97 relative to the work spindle as lever 100 is operated.

A master gear 104 having a ratchet gear 105 secured thereto by means of an expansion bushing 106 is secured on the tapered end 82 of work spindle 79 by means of the lock nut 93, a nut 107 for backing-off the master gear being interposed between the gear and the sleeve. Coacting with the master gear is a master rack 108 (see Fig. 3) secured to an arm 109 which is bifurcated and pivoted as indicated at 110 on an adjustable bracket 111 mounted on a bracket 112 extended upward from the base of the machine, arm 109 being adjustable vertically relative to bracket 112 by means of the bracket 111 and a screw shaft 113 and hand wheel 114 connected to the pivot bearing bracket 111 thus to adapt the pivot center of the bracket to be adjusted according to the diameter of the master gear which varies with the diameter of the gears to be ground.

The work spindle has three movements incident to the grinding operations, i. e., the movement with the work table transverse of the machine rotatable movement resulting from the relation of the master rack 108 and master gear 104 as the grinding of the gear teeth progresses, and an indexing movement between grinding of opposite teeth. The transverse movement of the work table is accomplished by a rack 115 (see Fig. 4) secured to base 76a of the table and engaged by a gear 116 on a shaft 117 which has secured to its outer end a hand wheel 118 which serves for moving the work table manually at times for effecting adjustments of the machine. Also, coacting with the shaft is one of the hydraulic motors 65, the one to the left as viewed in Fig. 8, the motor casing being fixed relative to the machine base 1 and having an inner rotatable member comprising an integral sleeve 119 and vane 119a keyed as indicated at 120 (Fig. 9) to a collar 121a which in turn is connected to the hub of hand wheel 118 by a spring tensioned clutch pin 122a adapted to be released by a plunger 122 supported in the hub of the wheel, the wheel being keyed to shaft 117 as indicated at 123. Thus the parts including the vane 119a of motor 65 and gear 116 normally operate in unison, the plunger 122 serving for disengaging wheel 118 by forcing pin 122a inward when it is desired to move the work table independently of the motor.

Supported on collar 121a on opposite sides of an annular groove 121b in the periphery of the collar are split rings 121 which are secured to collar 121a by clamp screws (not shown) thus adapting the rings to be adjusted one relative to the other circumferentially of collar 121a, the rings being spaced one from the other as indicated in Fig. 9 to provide an annular peripheral groove 124 between the rings, each ring being provided with an inwardly disposed notch 125, the notches being spaced one from the other circumferentially of collar 121a. The rings 121 are also provided with circumferentially spaced pins 126 spanning groove 124, the function of the rings being presently described.

Coacting with rings 121 is a double action pawl pivoted at 128 (see Fig. 3) comprising oppositely disposed latching members 127 acting to engage respectively the opposite notches 125 in rings 121. Also pivoted on center 128 is a tripping finger 129 having its free end extended into groove 124 and adapted to be engaged by pins 126. Pawl 127 has a clearance space 130 adjacent its pivot center into which the ends of oppositely disposed spring tensioned pins 131 are extended, the spring housings being in the body portion of the pawl.

Figure 3:
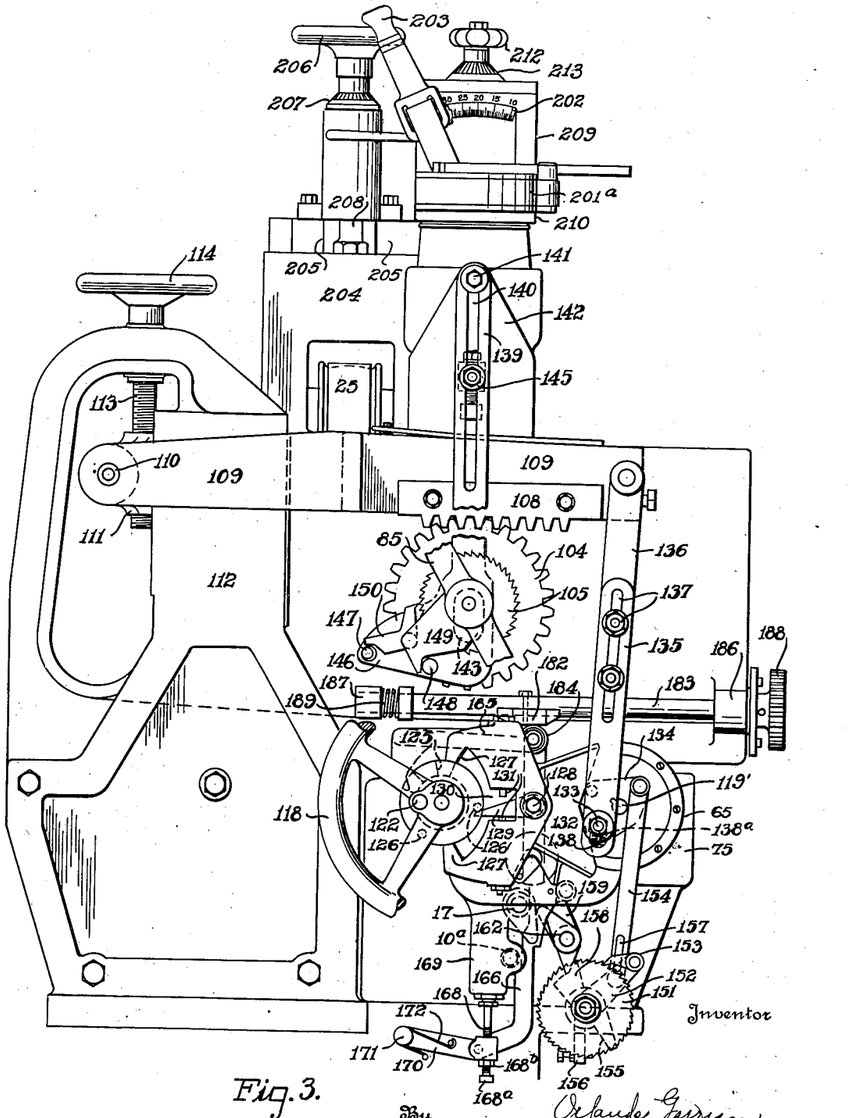
Fig. 3 is a front view of the machine in elevation.

As vane 119a rotates reciprocally and pins 126 are moved alternately to engage finger 129 both latching members 127 will be out of engagement with notches 125 until the work carriage 76 reaches the limit of its movement in one direction, at which point one of the notches 125, depending upon the direction of movement of the carriage, whether to the right or to the left, will register with the coacting pawl 127 which will act under pressure of its tension pin 131 to engage the notch and thus stop the motor and the movement of the work table. When the movement is in the opposite direction the other notch 125 and pawl 127 will act in like manner to stop the motor and work table. In the position of the parts as shown in Fig. 3 both pawls are shown disengaged from the notches, the carriage 76 being at an intermediate point as indicated in Fig. 4. It will be apparent from the relationship of the parts illustrated in Fig. 3 that the extent of travel of carriage 76 will be determined by the location of the rings 121 to effect the spacing of notches 125 in the arc traversed by the pawls over the periphery of the rings, the travel of the carriage being in exact proportion to the spacing of the notches 125 one from another. Thus the movement of the cariage will be determined by the assembling of the rings on collar 121a with respect to the spacing of notches 125 and can be regulated at will as will be best suited to the gears to be ground, the adjustments being for the purpose of minimizing the movement of the carriage to the requirement for passing the grinder wheel laterally through mesh with the gears A. Upon any adjustment of the rings to effect the relationship between notches 125, pins 126 which are secured in the rings will also be set accordingly, the pins serving by extending from one ring to the other across the annular groove 124 to hold the rings spaced laterally one from the other.

Formed integrally with pawl 127 and extended oppositely of the pawl on pivot center 128 is a double wing-shaped cam 132 and coacting with the cam is a cam follower 133 supported on a disc or pitman head 134 extended outward from the opposite motor 65 and supported on the piston shaft 119' of the motor, the outward extension of the part being best illustrated in Fig. 1. The action of the cam follower is to disengage the pawl after each engagement thereof with notches 125.

A divided link 135—136 is connected to the pitman head 134 on the same center as cam follower 133 and at its opposite end to arm 109 upon which the master rack 108 is supported, the link being adjustable by a slot and bolt connection 137 to adapt the same to the adjustment of arm 109 to the master gear 104. At its lower end connection link 135 is provided with a clearance slot 138 in which is seated a compression spring 138a which provides for free action of the connection at the limit of movement in the downward direction and to compensate for any variations of indexing the master gear and meshing of the master rack with the master gear.

The movement of arm 109 to disengage rack 108 from gear 104 also serves to index the master gear and with it the gears A on the work arbor. The mechanism for this movement consists of a vertically reciprocable bar 139 (Fig. 3) retained at its upper end by means of a slot 140, and stud 141 on a bracket 142 extended up from bracket 76, the lower end of the bar being supported by means of a slot 143 coacting with the hub of shoulder of expansion bushing 106 (see Fig. 6) the bar being thus free to move slidably vertically to the action of arm 109, the engagement between the arm and bar being effected by means of a nut and set screw 145 which can be adjusted to determine the extent of movement given the bar. The lower end of bar 139 has a laterally extended foot 146 in which pins 147 and 148 are secured, pin 148 coacting with a pawl 149 centered on shoulder 144 of nut 93 on the free end of which a pawl 150 is pivoted one end of which is adapted to engage ratchet 105 as bar 139 is moved upward, its opposite end being engaged by pin 147 to limit the free movement of the pawl. As pawl 149 is moved upward as pin 148 engages it, pawl 150 will move free of ratchet 105 during the first part of the movement and will engage the ratchet during the latter part of the movement thus acting to index the master gear during the interval that rack 108 is out of engagement with gear 104. By means of the mechanism 145 the action of the indexing mechanism can be adjusted to the exact requirement for variable operation.

An indexing mechanism for stopping the machine is also shown in Fig. 3 consisting of a ratchet 151, a pivoted arm 152, pawl 153 and link 154, which connects the arm to the pitman head 134, a finger 155 moving with arm 152 and coacting with an adjustable stop 156 acting to limit the movement of the arm in the idle direction, thus to determine the extent of the ratchet movement upon each actuation thereof. The connection of link 154 to arm 152 is by means of a slot 157 thus providing freedom of action at the connection when the link is at the limit of movement of its down stroke.

The function of the mechanism coacting with ratchet 151 is to stop the flow of liquid to motors 13a and 65 upon each complete revolution of the master gear 104 or upon each complete grinding of a gear. To this end a trip pawl 158 (see Fig. 18) is also secured to shaft 151a which supports the ratchet and acts upon each complete rotation of the ratchet to release shaft 17, upon which the control lever 15 is supported, from its locked relation with arms 159—160, the shaft being spring tensioned as at 17a to reverse the lever upon releasing of shaft 17 and thus to shut off the liquid to motor 13a at valve 14. Arms 159—160 are released from their engaged relation one with the other by a trip arm 161 supported on a shaft 162 and actuated by pawl 158 as ratchet 151 completes a rotation. Means for stopping the machine manually are also provided, consisting of a lever 15a connected to a tubular shaft 17b arranged telescopically relative to shaft 17 and a trip arm 163 secured on the opposite end of shaft 17b and adapted to engage an arm 164 on shaft 162 and thus to release the interlocked arms 159—160 which results in reversing lever 15 and stopping the hydraulic motors 13 and 65.

Arm 160 has a pin 165 secured in its free end which engages a shoulder 167 of a bar 166 and acts, as arm 160 moves downward, also to move the bar downward and with it the valve stem 168 which controls the outlet of motors 65, the connection of bar 166 to the valve stem being by means of a pivoted arm 170 pivotally connected to the bar as indicated at 171, which is tensioned in upward direction by a spring 172 thus acting to exert upward pressure on the valve stem 168.

Figure 8:
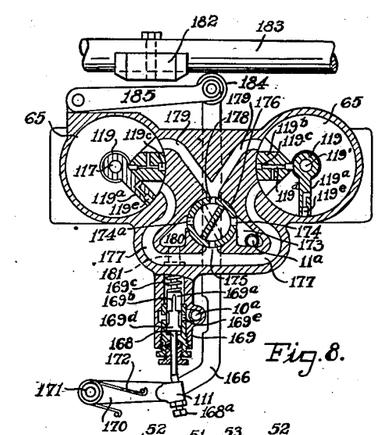
Fig. 8 is a vertical transverse sectional view through the hydraulic motors for operating the work table and indexing the work spindle.

The detail construction of the twin motors 65 as best illustrated in Fig. 8, the construction of the opposite motors is substantially identical and their operation inverse one motor of the other. Each motor housing has fixed therein and coacting with the vane 119a a wall 119b interposed between sleeve 119 and the wall of the cylinder and provided with flexible sealing devices, as leather or rubber 119c adapted to be forced by liquid admitted through a port 119d into pressure engagement with sleeve 119 and the wall of the cylinder, the vane 119a being also provided at its contact edge with the cylinder with a similar arrangement 119e, thus to prevent leakage in the cylinder when the motors are operating.

The liquid is admitted to the motors from line 11a through an open port into an external chamber 175 and passes through ports 174—175 of a valve 176, when the valve is adjusted as illustrated in Fig. 8, into a common by-pass 177 leading to both motors according to their alternated operation and when the valve is adjusted to the inverse position indicated by the dotted outline of the valve, the movement is through ports 174—178 and a by-pass 179 leading to both motors. The exhaust from the motors is alternately through by-passes 177—179, according to the direction of operation of the motors, to an external chamber 180 and thence through a port 181 leading to valve 169, and from the valve to the return line 10a leading to reservoir 10.

To attain the desired liquid pressure for operating when the machine is started valve 59 in line 12 is adjusted to resist the flow of liquid to motor 13a until the desired pressure is built up in the twin motors 65, the valve 11b in line 11a serving as a means to effect the operating pressure in motors 65 and thus to control the speed of the indexing movement, gage 59a indicating the liquid pressure in the motors.

Valve 169 sustains an important relation to the liquid pressure regulating means for operating the motors. When the starting lever 15 is moved inward to the position indicated in Fig. 18, pin 165 on arm 160 is moved out of engagement with the shoulder of link 166, thus permitting the link to be raised sufficiently by the action of spring 172 to partially open valve 169 thus permitting the motors to start under the action of the liquid, the liquid pressure in the motors being built up under the action of pump 6, the resistance of valve 169 and the load on the motors to the head pressure desired for operating the machine as determined by the adjustments of valves 14d, 46 and 59 and indicated on gage 59a. No liquid will pass valve 14 through valve chest 13 to motor 13a until the pressure in line 11—11a attains to the point at which the machine is adjusted to operate.

When the machine is in operation and the work carriage 76 travels back and forth valve 169 is acted upon variably by a cam shoe 182 supported on an eccentrically adjustable shaft 183, the cam being concentric to the shaft. As the work table moves in either direction the cam shoe engages a roller 184 on the free end of a pivoted arm 185 which is connected at its free end adjacent roller 184 with link 166, and acts to thrust the link downward and with it the valve stem 168 to an extent determined by the adjustment of shaft 183, the movement of the valve having the effect of restricting the flow of liquid through the valve and thus momentarily retarding the motor during the interval the grinder wheel is in engagement with the gears being ground. As the work rotates out of engagement with the grinder wheel in either direction cam 182 moves out of engagement with roller 184 thus causing the valve stem instantly to rise under the action of spring 172 to open valve 169 to greater extent, giving accelerated movement to the liquid through motors 65 thus acting to speed up the work carriage as the grinder wheel passes out of engagement with the work to the end of its movement in both directions. The cam shoe shaft 183 is mounted in eccentric sleeves operable in bearings 186—187. The shaft is adjustable for variation of feeds according to the degree of finish desired on the work by means of a knurled head 188, a tension spring 189 at the opposite end of the shaft acting to retain the shaft as adjusted.

Figure 22:
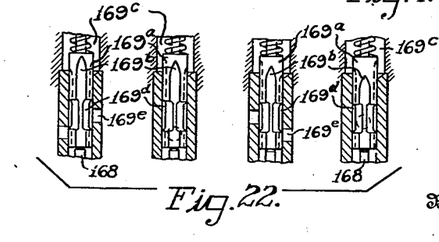
Fig. 22 consists of a plurality of detail sectional views of the discharge valve for the motors illustrated in Fig. 8.

An enlarged view of valve 169 is shown in detail in Fig. 22. The valve stem head 169a has a series of axially extended grooves 169b formed in its periphery, there being four grooves as here shown of unequal lengths. These grooves communicate with the upper valve chamber 169c and with an annular groove 169d formed in the valve head and communicating with a port 169e leading to the exhaust line 10a. As the valve stem is actuated the flow of liquid through grooves 169b to groove 169d will be accelerated or retarded accordingly as the movement is up or down. The valve stem has a threaded connection at its lower end (see Fig. 3) with the pivoted arm 170 and means as the head 168a on the end of the stem and lock nut 168b for adjusting the stem vertically thus to predetermine the normal position of the grooved valve stem head 169a and the effect the operating movement of the stem will have on the movement of the liquid.

By means of the variably adjustable valve stem 169a and the variable action thereon by cam 182 a wide range of adjustments can be given the feed of the work head to determine the degree of the grinding action on the gear teeth upon each reciprocation of the ginder wheel. When the cross feed of the work head is rapid, which will result when valve 169 is open to greater extent a greater surface on the face of a gear tooth will be ground upon each stroke of the wheel, and in like manner, when the valve is closed to greater degree, a lesser surface will be ground, the means of adjustment for the latter effect in grinding being such that a mere fraction of a thousandth of metal will be removed from the surface of the tooth upon a single action of the wheel, this being accomplished by adjusting the valve stem downwardly until the merest point of the longest groove 169b remains open for the passage of liquid through the valve which has the effect of slowing down the feed of the work head until the movement is scarcely perceptible, the grinding of the gears in this adjustment of the feed being exceedingly fine and accurate.

The wheel dresser mechanism, as herein stated, comprises the subject matter of Patent #1,573,153 and does not require detail description in connection with the present invention which relates to the grinder.

The main feature of the wheel dresser, as shown in Figs. 1, 3, 4 and 5, consists of a carbon or diamond point dresser 200 mounted on an axially and pivotally adjustable bar 201 which in turn is supported in a rotatable sleeve 201a, thus providing for moving the dresser point radially relative to the grinder wheel and rotatably from one side to the other of the work edge of the wheel at the required angle to dress the wheel to conform to the shape of a rack tooth adapted to mesh properly with the gear teeth being ground, a scale 202 being provided to enable an accurate adjustment being made of the dresser tool in its angular relation to the work edge of the wheel. A crank 203 serves for raising and lowering bar 201 to permit moving the dresser point over the entire surface on both sides and over the crown of the work edge of the wheel.

The wheel dresser as a whole is mounted on the grinder wheel head and, of course, moves with the ram when the grinder is operating, thus the wheel dresser is always relatively in the same relation to the grinder wheel. The grinder wheel is supported in a vertically adjustable wheel head 204 mounted on ways 205 formed on the end of the ram, the wheel head bracket being connected by a threaded shaft 208 to a hand adjusting wheel 206, a graduated collar 207 serving to indicate the extent of the adjustments. Supported on wheel head 204 is an intermediate bracket 209 upon which a vertically adjustable bracket 210 is supported, the latter being connected to a threaded shaft 211 provided with a hand wheel 212, graduated collar 213 serving to indicate the adjustments. The support 201a on which the tool dresser bar 201 operates is supported rotatably on bracket 210.

From the foregoing description it will be seen that the grinder wheel is adjustable vertically to allow for grinding gears of different diameters, that the wheel dresser is adjustable to compensate for the reduced diameter of the wheel resulting from repeated dressings of the wheel and that the dresser tool is adjustable to adapt the tool to dress both side edges and the crown edge of the grinder wheel. The means for effecting these adjustments are arranged for convenient operation and are of such a character that insure accuracy of the adjustments.

Having described my invention, I claim:

1. A gear grinder including an arbor for supporting gears rotatably, a master gear operably associated with the arbor, a grinder wheel operable reciprocally to traverse the gear teeth in the axial plane of the gear, a carriage for moving the gears at right angles to their axial plane, a primary hydraulic motor for moving the carriage reciprocally, and a secondary hydraulic motor operably associated with the primary motor for indexing the gears upon completion of each reciprocation of the carriage.

2. A gear grinder including an arbor for supporting gears rotatably, a master gear operably associated with the arbor, a grinder wheel operable reciprocally to traverse the gear teeth in the axial plane of the gear, a carriage for moving the gear in a direction at right angles to its axis, a motor for moving the carriage reciprocally, a motor operably associated with the first named motor and operable intermittently therewith for indexing the gears by rotating the arbor upon completion of each movement of the carriage, and means operably associated with the second motor for rendering both motors inoperative upon each complete rotation of the arbor.

3. A gear grinder including an arbor for supporting gears rotatably, a master gear operably associated with the arbor, a grinder wheel operable reciprocally to traverse repeatedly each gear tooth upon each indexing of the gear in the axial plane of the gear, a carriage operable constantly for moving the gears at right angles to their axial plane while in mesh with the grinder wheel, a hydraulic motor for moving the carriage reciprocally, and means operably associated with the motor and operable intermittently with the carriage for indexing the master gear.

4. A gear grinder including an arbor for supporting gears rotatably, a master gear operably associated with the arbor, a master rack operatively associated with the master gear for effecting axial alignment of the gears, means for effecting tooth alignment of the gears with the teeth of the master gear, a grinder wheel having its work edge dressed to conform to a rack tooth and operable to traverse the gear teeth by repeated reciprocal operations and adapted to pass through said gear in contact with opposite gear teeth incident to the reciprocal grinding operations thereon in the relation sustained by the master rack to the master gear, and means for moving the gears while in mesh with the grinder wheel.

5. A gear grinder including an arbor for supporting gears rotatably, a master gear operably associated with the arbor, a master rack operatively associated with the master gear for effecting axial alignment of the gears, means for effecting tooth alignment of the gears with the teeth of the master gear, a grinder wheel having its work edge dressed to conform to a rack tooth and operable to traverse the gear teeth by repeated reciprocal operations and adapted to pass through said gear in contact with opposite gear teeth incident to the reciprocal grinding operations thereon in the relation sustained by the master rack to the master gear, and means for reciprocally moving the gears transversely past the grinder wheel and for indexing the gears upon completion of each reciprocal movement thereof.

6. A gear grinder including an arbor for supporting gears rotatably, a master gear operably associated with the arbor, a master rack operatively associated with the master gear for effecting axial alignment of the gears, means for effecting tooth alignment of the gears with the teeth of the master gear, a grinder wheel having its work edge dressed to conform to a rack tooth and operable to traverse the gear teeth by repeated reciprocal operations and adapted to pass through said gear in contact with opposite gear teeth incident to the reciprocal grinding operations thereon in the relation sustained by the master rack to the master gear, and means for rotating the gears constantly during the grinding action thereon, for reciprocating the gears transversely past the grinder wheel and for indexing the gears upon completion of each reciprocal movement thereof.

7. A gear grinder including an arbor for supporting gears rotatably, a master gear operably associated with the arbor, a grinder wheel operable reciprocally to traverse the gear teeth in the axial plane of the gear, a carriage for moving the gears at right angles to their axial plane, a plurality of hydraulic motors connected to a common liquid pressure line, operably controlled one by the other and operable intermittently one relative to the other, one for causing the gears to move transversely past the grinder wheel coincident with the grinding operations thereon and the other for indexing the gears.

8. A gear grinder including an arbor for supporting gears rotatably, a master gear operably associated with the arbor, a grinder wheel operable reciprocally to traverse the gear teeth in the axial plane of the gear, a carriage for moving the gears at right angles to their axial plane, a plurality of hydraulic motors connected to a common liquid pressure line and operable intermittently one relative to the other, one for causing the gears to move transversely past the grinder wheel coincident with the grinding operations thereon and the other for indexing the gears, and interlocking means common to the motors and acting to prevent operation of one motor while the other motor is operating.

9. A gear grinder including an arbor for supporting gears rotatably, a master gear operably associated with the arbor, a grinder wheel operable reciprocally to traverse the gear teeth in the axial plane of the gear, a carriage for moving the gears at right angles to their axial plane, a plurality of hydraulic motors connected to a common liquid pressure line and operable intermittently one relative to the other, one for causing the gears to move transversely past the grinder wheel coincident with the grinding operations thereon and the other for indexing the gears, and means operatively associated with said motors acting automatically to shut off the liquid in the pressure line and to render the motors inoperative upon each complete indexing of the gears.

10. A gear grinder including an arbor for supporting gears rotatably, a master gear operably associated with the arbor, a grinder wheel operable reciprocally to traverse the gear teeth in the axial plane of the gear, a carriage for moving the gears at right angles to their axial plane, a plurality of hydraulic motors connected to a common liquid pressure line and operable reciprocally, rotatably and intermittently one relative to the other, one for moving the gears transversely past the grinder wheel coincident with the grinding operations thereon and the other for indexing the gears, and means for preventing operation of one motor while the other motor operates.

11. A gear grinder including in combination with a grinder wheel adapted to traverse the gear teeth in a plane parallel to the axis of the gears, motor controlled means for moving the gears laterally reciprocally in a plane at right angles to the axis of the gears and means for accelerating the motor as the grinder wheel moves out of engagement laterally with the gears.

12. A gear grinder including in combination with a grinder wheel adapted to traverse the gear teeth in a plane parallel to the axis of the gears, motor controlled means for moving the gears laterally reciprocally in a plane at right angles to the axis of the gears, and means for accelerating the motor as the grinder wheel moves out of engagement with the gears laterally and for retarding the motor after each acceleration thereof.

13. A gear grinder including a reciprocable ram, a grinder wheel movable with the ram and effecting an intermittent grinding action on the gear teeth in a plane parallel to the axis of the gears, means for rotating the gears coincident with the reciprocal grinding action thereon, and means for varying the speed of rotation of the gears for determining the degree of the reciprocal grinding actions thereon.

14. A gear grinder including a reciprocable ram, a grinder wheel movable with the ram and effecting an intermittent grinding action on the gear teeth in a plane parallel to the axis of the gears, means for rotating the gears coincident with the reciprocal grinding action thereon, a hydraulic motor for effecting rotation of the gears and means comprising an adjustable valve for regulating the flow of liquid relative to the motor for varying the speed of rotation of the gears for determining the degree of the reciprocal grinding actions thereon.

15. A gear grinder including a reciprocable ram, a grinder wheel movable with the ram and effecting an intermittent grinding action on the gear teeth in a plane parallel to the axis of the gears, means for rotating the gears coincident with the reciprocal grinding action thereon, a hydraulic motor for effecting rotation of the gears and means comprising an adjustable valve for regulating the discharge of liquid from the motor thus to regulate the speed of the motor and the speed of rotation of the gears whereby to effect the degree of the reciprocable grinding actions thereon.

16. A gear grinder including a reciprocable ram, a grinder wheel movable with the ram and effecting an intermittent grinding action on the gear teeth in a plane parallel to the axis of the gears, means for rotating the gears coincident with the reciprocal grinding action thereon, a hydraulic motor for effecting rotation of the gears and means comprising an adjustable valve operable intermittently for regulating the discharge of liquid from the motor thus to regulate the speed of the motor and the speed of rotation of the gears whereby to effect the degree of the grinding action thereon and timing the indexing of the gears between sequences of the grinding actions.

17. A gear grinder including a reciprocating ram, a grinder wheel movable with the ram, a liquid pressure motor for operating the ram, a carriage for supporting gears for grinding and operably coordinated with the ram, a liquid pressure motor for operating the carriage, a liquid line connection between said motors and means in the line for preventing operation of the first named motor until the second motor attains operating pressure.

18. A gear grinder including a reciprocating ram, a grinder wheel movable with the ram, a liquid pressure motor for operating the ram, a carriage for supporting gears for grinding, a liquid pressure motor for operating the carriage, a liquid line connection between said motors, a valve in the line for preventing operation of the first named motor until the liquid in the second motor attains operating pressure, and a gage for indicating the pressure.

19. A gear grinder including a reciprocating ram, a grinder wheel movable with the ram, a liquid pressure motor for operating the ram, a carriage for supporting gears for grinding, a liquid pressure motor for operating the carriage, a liquid line connecting the motors, and a series of valves associated with the motors and said line yieldable under liquid pressure thereon above a predetermined point to restore the liquid pressure to normal.

20. A gear grinder including a reciprocable grinder wheel, a liquid pressure motor for operating said wheel, a carriage for moving gears reciprocally relative to said wheel for grinding, a liquid pressure motor operably associated with the first named motor for operating said carriage and means operable automatically upon completion of a sequence of grinding operations for rendering said motors inoperative.

21. A gear grinder including a reciprocable grinder wheel, a liquid pressure motor for operating said wheel, a carriage for moving gears reciprocally relative to said wheel for grinding, liquid pressure motors for operating said carriage, means actuated by the motors, for indexing the gears, a liquid line connecting said motors, and means operable automatically following a sequence of grinding operations for rendering the motors inoperable.

22. A gear grinder comprising a reciprocating ram supporting a grinder wheel, a hydraulic motor for actuating the ram, and means including a valve of said motor operable by the ram for effecting operation of the ram.

23. A gear grinder comprising a reciprocating ram supporting a grinder wheel, a hydraulic motor for actuating the ram, means associated with the motor including oppositely arranged valves for effecting easement of the liquid pressure in the motor.

24. Gear grinder operating means including a reciprocating ram supporting a grinder wheel, a hydraulic motor for actuating the ram, said motor including a liquid chamber, a liquid supply line leading to said chamber and a return line leading from the chamber, a valve for regulating the admission of liquid to said chamber, an auxiliary cylinder, a piston and a connection between the piston and the ram for regulating the travel of the ram, and valves for regulating the working pressure of the motor.

25. A gear grinder operating means comprising a source of liquid supply, a pump connected with said liquid, a liquid motor, a line connection for charging the motor with liquid from the pump, a return line for the liquid from the motor to the source of liquid supply, and a valve in the liquid supply line for regulating the pressure of liquid in the motor.

26. A driving connection for a gear grinder comprising a pulley on the axis of a wheel, a reciprocable arm, oppositely arranged pulleys on said arm including a pair of pulleys supported on a pivoted arm spring-tensioned in one direction, a pawl and ratchet for adjusting the angle of said arm to vary the center line between the pulleys and a belt traversing said pulleys.

27. A driving connection for a gear grinder comprising a pulley on the axis of a wheel, a reciprocable arm, oppositely arranged pulleys on said arm including a pair of pulleys supported on a pivoted arm adjustable variably to the vertical, one of said paired pulleys being adjustable at angles variable to the axis of the other pulley, and a belt traversing the pulleys.

28. A gear grinder including an arbor for supporting gears for grinding, means for aligning the gears and means comprising a threaded stem for engaging the arbor and a hand leverage device coacting with said stem for moving the gears axially for securing the same on the arbor.

29. A gear grinder including an arbor for supporting gears for grinding, a master gear supported in axial alignment with the gears, means for aligning the gears with the master gears, and means at the opposite end of the arbor for moving the gears axially for securing the same on the arbor.

30. A gear grinder comprising a reciprocatory ram supporting a grinder wheel, a hydraulic motor for actuating the ram, a valve for supplying fluid to said motor to effect reciprocatory movements of said ram, pressure releasing valves associated with said supply valve, whereby the reversal of movement of said ram may be effected without shock, resilient means on said valves for forcing them toward their seats, and means to adjust the pressure with which said valves are held against their seats.

In testimony whereof, I affix my signature.

ORLANDO GARRISON.